United States Patent
Srour

(10) Patent No.: US 11,274,697 B2
(45) Date of Patent: Mar. 15, 2022

(54) FLEXIBLE FLANGE COLLAPSIBLE DISCS

(71) Applicant: Ikey Srour, Brooklyn, NY (US)

(72) Inventor: Ikey Srour, Brooklyn, NY (US)

( * ) Notice: Subject to any disclaimer, the term of this patent is extended or adjusted under 35 U.S.C. 154(b) by 550 days.

(21) Appl. No.: 16/354,889

(22) Filed: Mar. 15, 2019

(65) Prior Publication Data

US 2020/0291986 A1    Sep. 17, 2020

(51) Int. Cl.
*F16C 11/12* (2006.01)
*F16F 1/42* (2006.01)

(52) U.S. Cl.
CPC .............. *F16C 11/12* (2013.01); *F16F 1/428* (2013.01); *F16F 2236/027* (2013.01)

(58) Field of Classification Search
CPC ........... F16C 11/12; F16F 1/185; F16F 3/023; H05K 7/2049; H05K 5/0204; H01L 23/40; H01L 23/473; H01L 23/3675; H01L 23/4012; H01L 2023/4068; H01L 2924/00; H01I 25/105; H04B 1/38; H04B 1/3888; H04B 1/3877; H04M 1/04; H04M 1/15; F16B 2/02; F16B 2/12; F16M 11/40; F16M 11/06; F16M 13/00; H01R 13/33; G06F 1/1626
USPC ................... 403/410; 267/73, 141–143, 145, 267/151–153, 165
See application file for complete search history.

(56) References Cited

U.S. PATENT DOCUMENTS 1,640,670 A * 8/1927 Schaeffer ................. F16C 11/12
                                                                  464/86
2,825,378 A    3/1958 Vaca
3,029,094 A * 4/1962 Parlasca et al. .. F16L 27/12751
3,773,203 A   11/1973 Grimaldi et al.
4,760,866 A    8/1988 Adler
D314,865 S     2/1991 Tuisku
5,053,687 A * 10/1991 Merlet ................. B25J 17/0216
                                                                  318/568.2
D327,808 S     7/1992 Kline
D330,632 S    11/1992 Hensley
(Continued)

FOREIGN PATENT DOCUMENTS

WO   WO-2020009795 A1 *  1/2020  .......... F16M 11/121

OTHER PUBLICATIONS

Fasttech.com. RFID Blocking Credit Card Holder Wallet Money Clip Case. Date listed Oct. 2017 [date retrieved Mar. 6, 2018]: https://www.fasttech.com/products/9343200. (Cited by Examiner).

*Primary Examiner* — Robert A. Siconolfi
*Assistant Examiner* — San M Aung
(74) *Attorney, Agent, or Firm* — Michael J. Feigin, Esq.; Feigin and Fridman LLC

(57) ABSTRACT

Collapsible discs move towards or away from each other in embodiments of the disclosed technology by changing the angle of flanges which connect the two discs together. The flanges connect to each respective disc by way of one a fixed connection to one disc and a slidable connection to the other. The flanges slide into portals in the bottom disc and then extend along and into a hollow space therein the bottom disc. The flanges have a tip or multiple tips which is/are wider than a rest of an elongated length thereof which frictionally holds the flanges, and therefore, the discs in places until the discs are rotated causing the flanges to be pulled out from or pushed into the portals. This, in turn, causes the discs to move closer together or become further apart in embodiments of the disclosed technology.

14 Claims, 6 Drawing Sheets

(56) References Cited

U.S. PATENT DOCUMENTS

| | | | |
|---|---|---|---|
| D332,347 S | 1/1993 | Raadt et al. | |
| D352,896 S | 11/1994 | Jones | |
| D404,762 S | 1/1999 | Vogel | |
| 5,944,080 A | 8/1999 | Podwika | |
| 6,250,618 B1 * | 6/2001 | Greenhill | F16F 1/328 |
| | | | 267/162 |
| D446,647 S | 8/2001 | Protheroe | |
| D446,648 S | 8/2001 | Protheroe | |
| D447,868 S | 9/2001 | Protheroe | |
| D470,657 S | 2/2003 | Kawamura | |
| D471,008 S | 3/2003 | Dubone | |
| D475,696 S | 6/2003 | Hussaini et al. | |
| D481,537 S | 11/2003 | Vaughn | |
| D489,051 S | 4/2004 | Shiraki et al. | |
| 6,736,285 B2 | 5/2004 | Steward-Stand | |
| D492,944 S | 7/2004 | Drakoulis et al. | |
| D509,955 S | 9/2005 | Williams | |
| D512,914 S | 12/2005 | Moretti | |
| D516,577 S | 3/2006 | Matsuoka | |
| D521,499 S | 5/2006 | Takita et al. | |
| D525,612 S | 7/2006 | Densho | |
| D527,898 S | 9/2006 | Tavone | |
| D531,618 S | 11/2006 | Kennemer et al. | |
| D536,614 S | 2/2007 | Peterson et al. | |
| D547,062 S | 7/2007 | Chang | |
| D560,116 S | 1/2008 | Brassard | |
| D572,465 S | 7/2008 | Beck | |
| D601,366 S | 10/2009 | Barabas et al. | |
| D605,188 S | 12/2009 | Martinez | |
| D610,798 S | 3/2010 | Silvera | |
| D618,692 S | 6/2010 | Deutsch et al. | |
| D619,559 S | 7/2010 | Voorhees | |
| D622,958 S | 9/2010 | Moore | |
| D626,935 S | 11/2010 | Ohtani et al. | |
| D627,330 S | 11/2010 | Otsuka | |
| D633,477 S | 3/2011 | Lorenzo | |
| D633,644 S | 3/2011 | Sprengers | |
| D637,583 S | 5/2011 | Beal et al. | |
| 7,987,148 B2 | 7/2011 | Hangartner et al. | |
| D647,881 S | 11/2011 | Warner | |
| D647,892 S | 11/2011 | Ragde, Jr. | |
| D650,371 S | 12/2011 | Wibby et al. | |
| D652,825 S | 1/2012 | Bau | |
| D652,836 S | 1/2012 | Voorhees | |
| D654,054 S | 2/2012 | Kohte et al. | |
| D655,692 S | 3/2012 | Silverman et al. | |
| D656,135 S | 3/2012 | Swartz et al. | |
| D656,926 S | 4/2012 | Jones, III et al. | |
| D656,927 S | 4/2012 | Jones, III et al. | |
| D656,928 S | 4/2012 | Jones, III et al. | |
| D658,164 S | 4/2012 | Chan | |
| D660,306 S | 5/2012 | Voorhees | |
| 8,186,642 B2 | 5/2012 | Weiss-Vons | |
| 8,317,046 B2 | 11/2012 | Vanderberg et al. | |
| D675,197 S | 1/2013 | Losiewicz | |
| D681,020 S | 4/2013 | Magness et al. | |
| D681,612 S | 5/2013 | Palacios | |
| D681,613 S | 5/2013 | Magness et al. | |
| D689,479 S | 9/2013 | Soffer | |
| D690,931 S | 10/2013 | Minn | |
| D691,988 S | 10/2013 | Warner | |
| 8,560,031 B2 | 10/2013 | Barnett et al. | |
| D693,818 S | 11/2013 | Webber | |
| D694,222 S | 11/2013 | Thompson et al. | |
| D694,463 S | 11/2013 | Sieczkowski | |
| 8,616,327 B1 | 12/2013 | Palacios | |
| D699,757 S | 2/2014 | Wilkey | |
| D703,647 S | 4/2014 | Kim | |
| D703,949 S | 5/2014 | Chappell et al. | |
| D705,199 S | 5/2014 | Huang et al. | |
| D705,229 S | 5/2014 | Wengreen et al. | |
| D705,764 S | 5/2014 | Thoni | |
| D705,767 S | 5/2014 | Yoon | |
| 8,737,066 B1 | 5/2014 | Block | |
| D707,965 S | 7/2014 | Requa | |
| D710,340 S | 8/2014 | Wengreen et al. | |
| D714,126 S | 9/2014 | Pyon et al. | |
| D715,784 S | 10/2014 | Lin et al. | |
| D716,043 S | 10/2014 | Wilk | |
| D717,780 S | 11/2014 | Tussy | |
| D718,750 S | 12/2014 | Young et al. | |
| D719,143 S | 12/2014 | Vidovic | |
| D719,350 S | 12/2014 | Daoura | |
| D721,373 S | 1/2015 | Logereau | |
| D722,235 S | 2/2015 | Meng | |
| D723,799 S | 3/2015 | Glass et al. | |
| D724,841 S | 3/2015 | Schneider et al. | |
| D726,234 S | 4/2015 | Needham | |
| D728,230 S | 5/2015 | Oas | |
| D728,535 S | 5/2015 | Degenkolb | |
| D730,047 S | 5/2015 | Yi | |
| D734,305 S | 7/2015 | Wengreen | |
| D735,174 S | 7/2015 | Wengreen | |
| D738,619 S | 9/2015 | Gluck | |
| D738,872 S | 9/2015 | Erickson-Davis et al. | |
| D739,389 S | 9/2015 | Prohaska | |
| D743,409 S | 11/2015 | Chen | |
| D745,014 S | 12/2015 | Vales | |
| D745,274 S | 12/2015 | Minn et al. | |
| D747,093 S | 1/2016 | Rogers | |
| D748,615 S | 2/2016 | Lee et al. | |
| D749,069 S | 2/2016 | Senoff | |
| D749,549 S | 2/2016 | Wengreen | |
| D751,289 S | 3/2016 | Gluck | |
| D756,222 S | 5/2016 | Lopez et al. | |
| D756,366 S | 5/2016 | Floersch | |
| D759,966 S | 6/2016 | Pignotti | |
| D761,236 S | 7/2016 | Wengreen | |
| D763,835 S | 8/2016 | Wengreen | |
| D765,063 S | 8/2016 | Wengreen | |
| D765,064 S | 8/2016 | Wengreen | |
| D766,228 S | 9/2016 | Haymond | |
| D768,382 S | 10/2016 | Wu | |
| D768,383 S | 10/2016 | Wu | |
| D769,859 S | 10/2016 | Herbst et al. | |
| D772,212 S | 11/2016 | Daniel et al. | |
| D772,739 S | 11/2016 | Browning et al. | |
| D772,882 S | 11/2016 | Paschke et al. | |
| 9,486,910 B2 | 11/2016 | Stevens et al. | |
| D773,325 S | 12/2016 | Browning et al. | |
| D774,887 S | 12/2016 | Torrison et al. | |
| D775,824 S | 1/2017 | King | |
| D776,426 S | 1/2017 | Smith | |
| D776,529 S | 1/2017 | Torrison et al. | |
| D777,025 S | 1/2017 | Turksu et al. | |
| D777,162 S | 1/2017 | Erickson-Davis et al. | |
| D778,884 S | 2/2017 | Taptic et al. | |
| D779,466 S | 2/2017 | Wengreen | |
| D780,449 S | 3/2017 | King | |
| D781,832 S | 3/2017 | Saitko et al. | |
| D783,593 S | 4/2017 | Chen | |
| D784,811 S | 4/2017 | Scevola | |
| D784,977 S | 4/2017 | Ormsbee et al. | |
| D784,978 S | 4/2017 | Hobbs et al. | |
| D789,076 S | 6/2017 | Pierre | |
| D792,220 S | 7/2017 | Simons et al. | |
| D794,007 S | 8/2017 | Zhang | |
| D794,456 S | 8/2017 | Rockwell | |
| D794,607 S | 8/2017 | Srour | |
| D798,591 S | 10/2017 | King | |
| D801,176 S | 10/2017 | Lynd et al. | |
| 9,787,348 B2 | 10/2017 | Srour | |
| D804,306 S | 12/2017 | Simons et al. | |
| D806,386 S | 1/2018 | King | |
| D807,746 S | 1/2018 | Fleming | |
| D808,158 S | 1/2018 | King | |
| D817,316 S | 5/2018 | Srour | |
| 9,970,589 B2 | 5/2018 | Hobbs et al. | |
| 2003/0086748 A1 * | 5/2003 | Culpepper | F16M 7/00 |
| 2004/0145870 A1 | 7/2004 | Minami et al. | |
| 2006/0283859 A1 | 12/2006 | Lu | |
| 2011/0188926 A1 * | 8/2011 | Stratton | B23P 11/00 |
| | | | 403/53 |
| 2011/0192857 A1 | 8/2011 | Rothbaum et al. | |

(56) References Cited

U.S. PATENT DOCUMENTS

| | | |
|---|---|---|
| 2012/0042476 A1 | 2/2012 | Karmatz |
| 2012/0104185 A1 | 5/2012 | Carroll |
| 2012/0168483 A1 | 7/2012 | Jambunathan et al. |
| 2013/0001382 A1 | 1/2013 | Jang |
| 2013/0148271 A1 | 6/2013 | Huang |
| 2013/0277991 A1 | 10/2013 | Wu |
| 2014/0133897 A1* | 5/2014 | Ceallaigh ................. G12B 5/00 |
| 2014/0317329 A1 | 10/2014 | Barnett et al. |
| 2015/0077927 A1 | 3/2015 | Barnett et al. |
| 2015/0201743 A1 | 7/2015 | Erickson-Davis et al. |
| 2015/0288409 A1 | 10/2015 | Forsythe |
| 2015/0335138 A1 | 11/2015 | Juarbe |
| 2015/0365125 A1 | 12/2015 | Murphy et al. |
| 2016/0058162 A1 | 3/2016 | Wang et al. |
| 2017/0195000 A1* | 10/2017 | Srour ........................ F16B 2/06 |
| 2017/0293207 A1 | 10/2017 | Jeon |
| 2018/0051846 A1 | 2/2018 | Hobbs et al. |
| 2018/0066791 A1 | 3/2018 | Hobbs et al. |
| 2018/0146078 A1* | 5/2018 | Shin ........................ F16F 1/122 |
| 2018/0283600 A1* | 10/2018 | Hobbs .................... F16M 13/04 |

\* cited by examiner

FLEXIBLE FLANGE COLLAPSIBLE DISCS

FIELD OF THE DISCLOSED TECHNOLOGY

The disclosed technology relates to accessories which collapse, and more specifically, those that do so with sliding arms.

SUMMARY OF THE DISCLOSED TECHNOLOGY

A set of collapsible discs include a top and bottom disc. A plurality of individual flexible flanges extends from the top disc through respective portals in the bottom disc. Each of the plurality of individual flexible flanges extends further or less far into the respective portals in the bottom disc when the top and bottom disc are rotated relative to one another.

A "disc" is defined as "a device with a substantially circular most elongated plane thereof." The directions "top" and "bottom" are relative and interchangeable for purposes of this disclosure. In some embodiments, there is a horizontal line or plane of symmetry between the top and bottom halves of the device.

A "living hinge" is defined as "a flexure bearing which is flexible (changeable angle) and connects two rigid elements together in a way in which the rigid pieces can repeatedly (1000+ times) bend relative to one another and remain connected." Living hinges of embodiments of the disclosed technology are formed from thinned plastic material between disc and a part of a rotating hinge. In some embodiments, a disc, living hinge, and rotating hinge are formed together in a single mold. In some embodiments, two of such single molds are formed and a pin joins the rotating hinges together to form the collapsible device.

A "sliding hinge" or to be "slidably hinged" is to rotates a flange by having the flange move parallel along a length of an inset, cutaway, cavity, or portal in a disc changing an angle of the flange relative to the disc or discs.

The "discs" of embodiments of the disclosed technology have top and bottom sides which are elliptical and/or circular and interior space between the top and bottom sides which is hollow, filled, or partially filled and partially hollow. The hollow sections can have multiple tracks with elliptical or circular openings therein where each flexible flange passes into. The flanges can be fixedly or hingedly attached (such as by way of a flexural hinge) to the top disc and slidably attached to the bottom disc such that the flanges can flex (are flexible) and are resilient (able to change shape but return or substantially return or be shaped into a pre-changed shape without causing permanent or structural damage thereto).

The flexible flanges have ends, such as bulbous ends, which flare out or are wider at parts then a body thereof. The body, a longest part thereof can have a continuous cross-sectional shape and area (e.g. circular) while the tip, end, or bulbous end are a part which has a wider cross-sectional area which remains or tapers into an extreme end of each respective flange. The wider portion has a larger or equal cross-section than a track within the bottom disc and can be somewhat compressible (defined as "forces pressing thereagainst are able to shrink the cross-sectional area and the device is resilient"). In this manner, in a resting condition, the flanges remain in place relative to the bottom disc and the discs remain in place relative to each other. Twisting or rotating motion of the discs is required, in embodiments of the disclosed technology, to move the discs closer/further together while causing the flanges to be more inserted/more removed from the bottom disc.

Each end is circumferentially abutted against a respective hollow track within the bottom disc in some embodiments of the disclosed technology. Each respective portal extends into a track which bends in a curvilinear manner until becoming parallel with a top and/or bottom side of the bottom disc in embodiments of the disclosed technology. The plurality of individual (separate/spaced apart from each other) flexible flanges can be equi-distant from each other, such as at 120 degree increments arranged in a circular or equilateral triangular configuration.

The portal of the bottom disc through which a flange enters can be elliptical and non-circular. The two discs can rotate with respect to each other which causes the flanges to rotate and further enter or leave respective portals and hollow tracks within the bottom disc in embodiments of the disclosed technology. When rotating in a first direction, the discs get closer together and the flanges push into the bottom disc more, while when rotating in a second direction which is opposite the first, the flanges pull out of the bottom disc more than they were previously and the discs become further apart in embodiments of the disclosed technology.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

Collapsible discs move towards or away from each other in embodiments of the disclosed technology by changing the angle of flanges which connect the two discs together. The flanges connect to each respective disc by way of one a fixed connection to one disc and a slidable connection to the other. The flanges slide into portals in the bottom disc and then extend along and into a hollow space therein the bottom disc. The flanges have a tip or multiple tips which is/are wider than a rest of an elongated length thereof which frictionally holds the flanges, and therefore, the discs in places until the discs are rotated causing the flanges to be pulled out from or pushed into the portals. This, in turn, causes the discs to move closer together or become further apart in embodiments of the disclosed technology.

Embodiments of the disclosed technology will become more clear in view of the following description of the figures.

Figure 1:
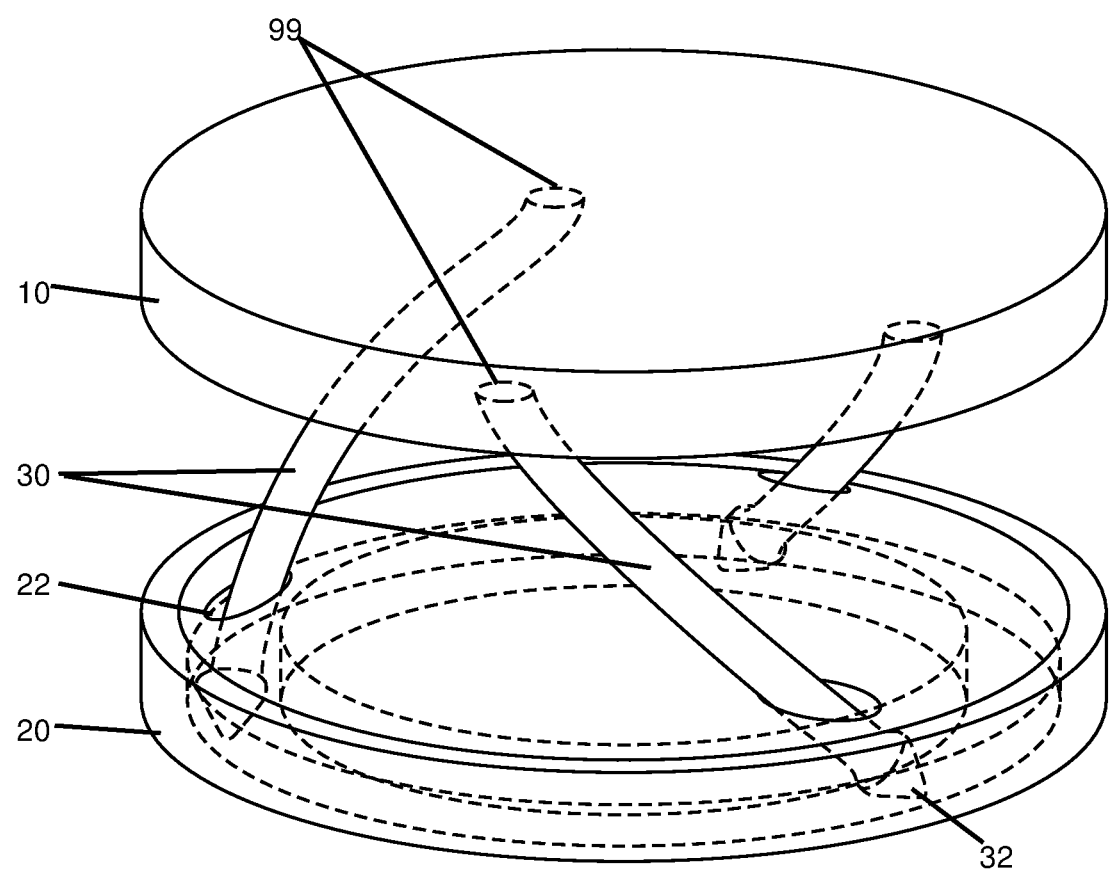
FIG. 1 shows a translucent top and side perspective view of rotating and collapsible discs of embodiments of the disclosed technology.

FIG. 1 shows a translucent top and side perspective view of rotating and collapsible discs of embodiments of the disclosed technology. A top disc 10 and bottom disc 20 are spaced apart from each other in embodiments. At rest, the discs 10 and 20 are held in place relative to one another by way of a plurality of individual flexible, resilient, flanges 30. The flanges can each be substantially identical or be of different lengths and extend from and into a position which is equi-distant from a center point of a surface of the respective discs. The flanges 30 can also be equi-spaced from each other around a circle or at points of an equilateral triangle. In other embodiments, the flanges are unequally spaced from each other or from a center of a disc. The term "center" or "center-point", unless otherwise qualified, is defined as "at a center of an elongated top or bottom side of a disc." In this disclosure the terms "top" and "bottom" are relative to the direction of the paper in FIG. 3 where the top side of the sheet is the "top" side of the device, and each respective element within the device has a top and bottom side relative thereto. Thus, the top disc 10 is defined as being at the top side of the device and it's respective top side of the disc is the one which faces away from the respective bottom side of the top disc and away from the bottom disc 20 and so forth.

The flanges 30 can be fixedly and permanently (designed to remain connected and be irremovable without hindering functionality/effectiveness of the device as a whole) attached to the top disc 10 by way of an attachment 99. The attachment 99 can be by way of being procured in a single mold, printing, or construction or by way of a permanent fastening mechanism. The opposite end of the flanges 30 ends in a bulbous tip 32 or otherwise a tip which is defined by a part of the flange which has a cross-sectional area which is greater than that of a rest of the flange 30. The bulbous tip 32 can extend to end of the most elongated length of the flange 30 and be defined as such even if the extreme end is tapered, as shown.

Figure 2:
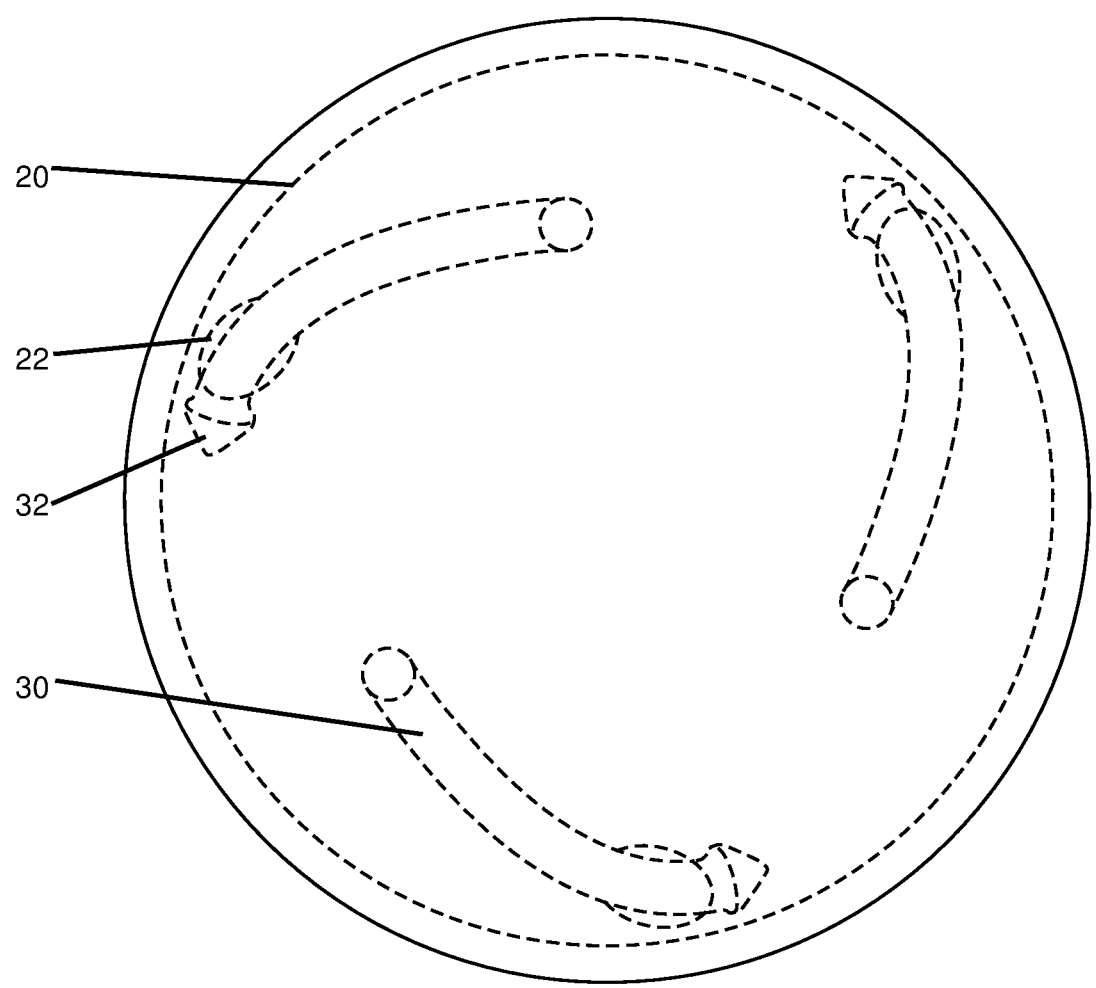
FIG. 2 shows a bottom plan view of a bottom disc of the rotating and collapsible discs of FIG. 1.

FIG. 2 shows a bottom plan view of a bottom disc of the rotating and collapsible discs of FIG. 1. In this view the flanges 30 with tips 32 are shown being curvilinearly oriented and passing into respective elliptical portals 22 of the bottom disc 20. The elliptical portals can be non-circular or circular. A "non-circular" portal, for purposes of this disclosure, is one which has an eccentricity of at least 0.05.

Figure 3:
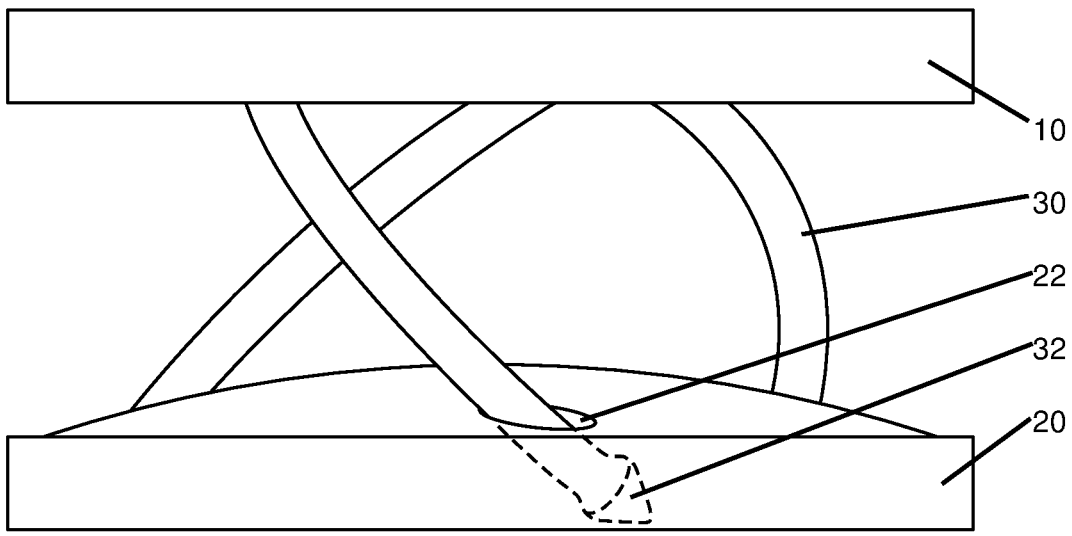
FIG. 3 shows a side elevation view of the rotating and collapsible discs of FIG. 1 in an expanded condition.

FIG. 3 shows a side elevation view of the rotating and collapsible discs of FIG. 1 in an expanded condition. In the expanded condition the elongated length of the flanges 30 is most visible and outside of the bottom disc 20 with the bulbous tip 32 and only a small minority (less than 20%) of the flange length within the bottom disc 20.

Figure 4:
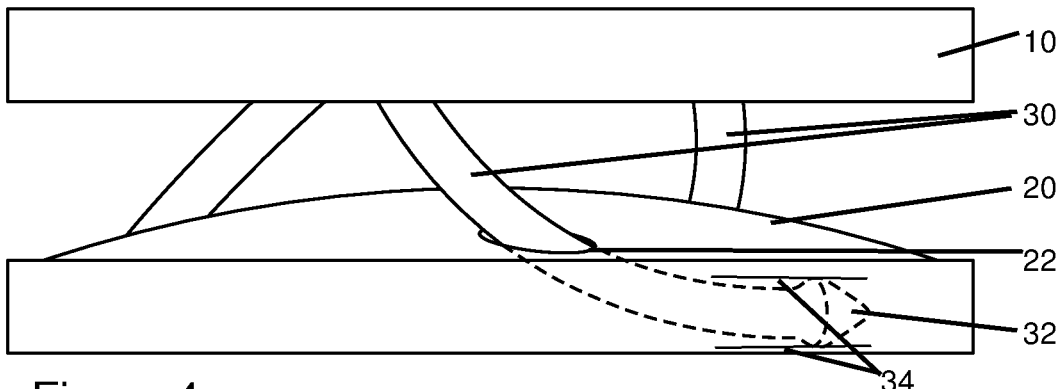
FIG. 4 shows a side elevation view of the rotating and collapsible discs of FIG. 1 in a collapsing condition.

FIG. 4 shows a side elevation view of the rotating and collapsible discs of FIG. 1 in a collapsing condition. Here, the flanges 30 are at least 40% inside of (surrounded by) the bottom disc 20 and more particularly, a hollow track 34. In this view, one can see the bulbous tip 32 abuts edges of the hollow track 34. The abutment can be on either side of the bulbous tip and/or circumferentially around all sides of the bulbous tip. The bulbous tip 32, as shown, is slightly compressed by the track 34. The friction between the tip 32 and track 34 prevents a respective flange 30 from moving within the track 34 when the discs 10 and 30 are at rest with respect to one another. Further, the friction in the track keeps the discs 10 and 30 at rest with respect to one another, but one can rotate the discs 10 and 30 with respect to one another to move the flanges 30 more in or out of the portal 22 and disc 30. Thus, by rotating the discs 10 and 30 in opposite directions from each other, one can either causes the flanges 30 to be further inserted or further removed from the disc 30 and the discs 10 and 30 to be moved closer or further way from each other as the flanges extend in a more vertical (top to bottom) or more horizontal (opposite of vertical) direction and become more curved with an inflection point moving up the flange(s) 30 as the discs are moved closer together.

Figure 5:
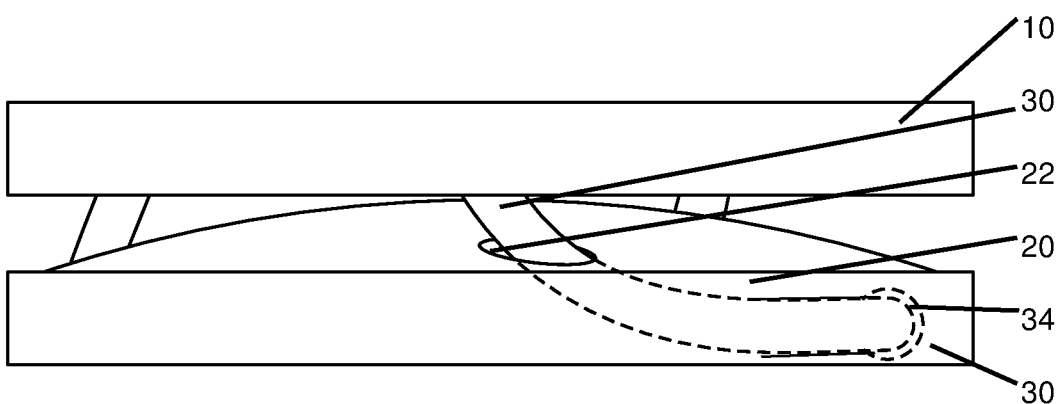
FIG. 5 shows a side elevation view of the rotating and collapsible discs of FIG. 1 in a collapsed condition.

FIG. 5 shows a side elevation view of the rotating and collapsible discs of FIG. 1 in a collapsed condition. Here, the majority or large majority (80%+) of each flange 30 is within the track 34 of the bottom disc 20 and the discs 10 and 30 are closest together.

Figure 6:
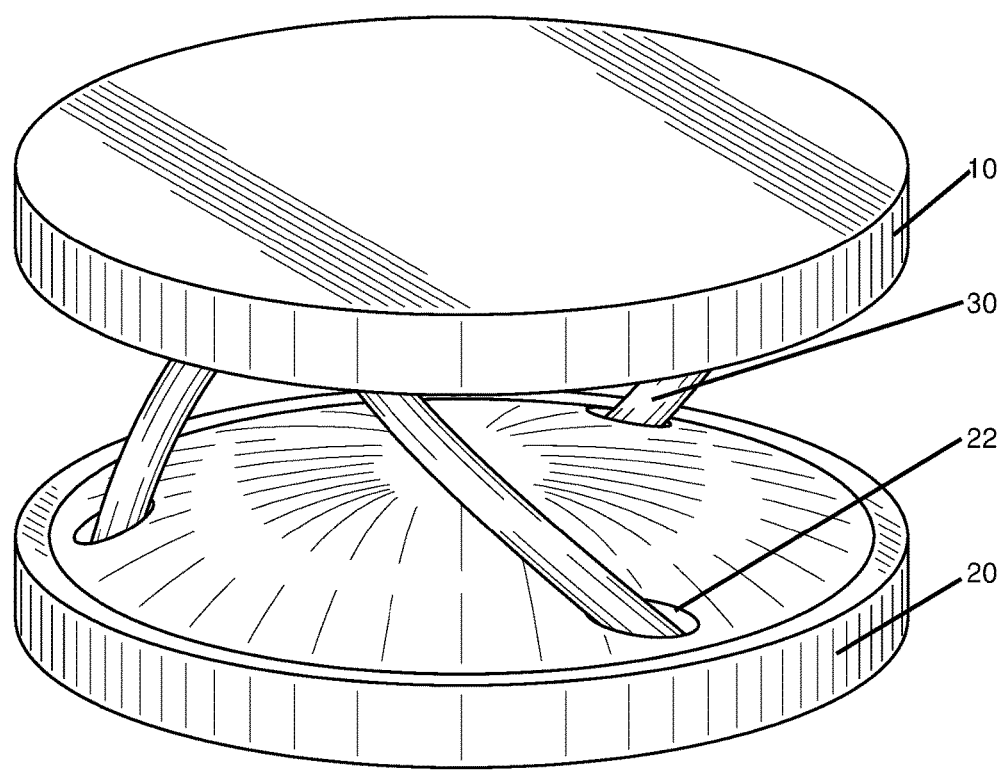
FIG. 6 shows a solid top and side perspective view of rotating and collapsible discs of FIG. 1.
Figure 7:
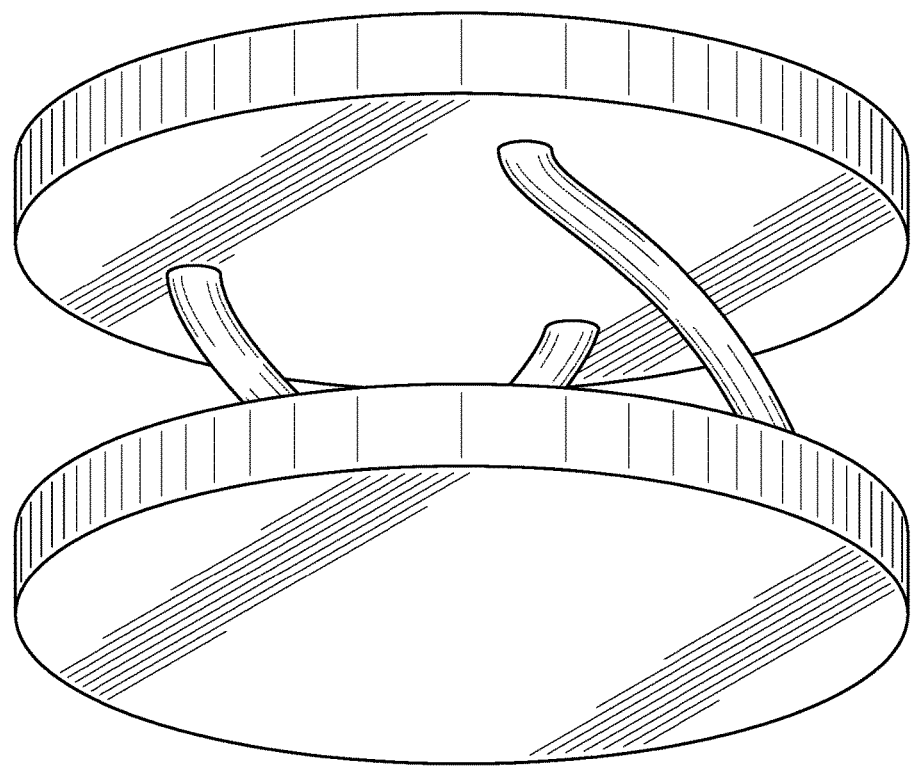
FIG. 7 shows a bottom and side perspective view of rotating and collapsible discs of FIG. 6.
Figure 8:
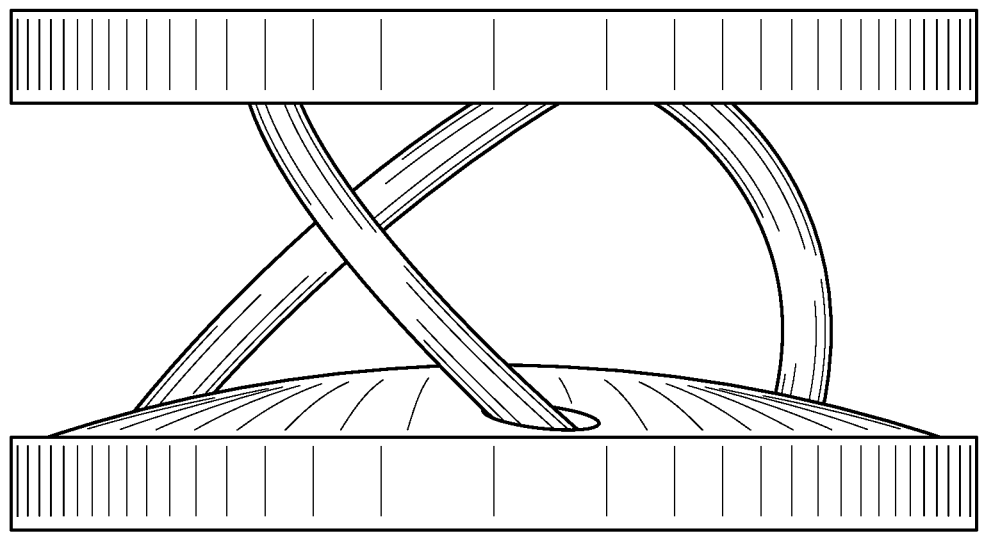
FIG. 8 shows a first elevation view of the rotating and collapsible discs of FIG. 6.
Figure 9:
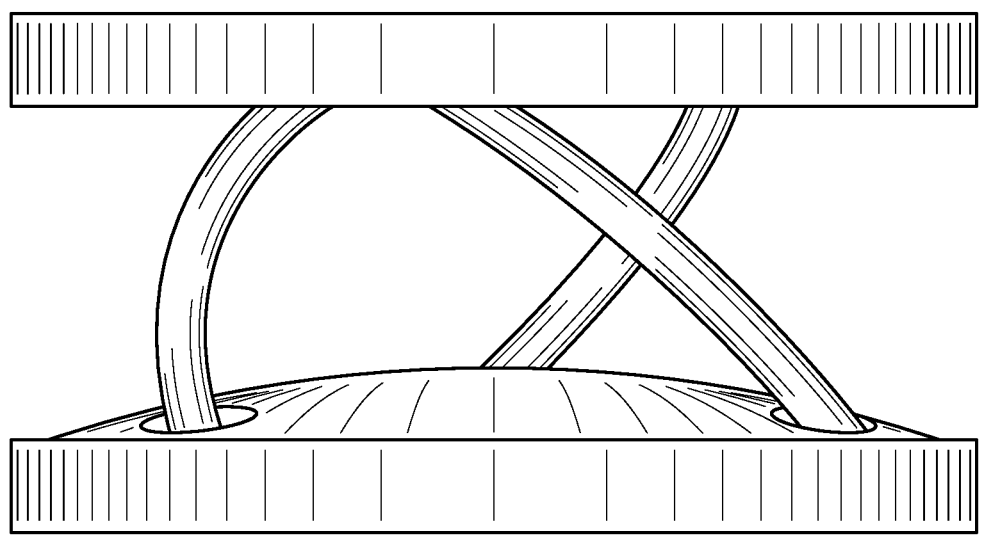
FIG. 9 shows a second elevation view of the rotating and collapsible discs of FIG. 6.
Figure 10:
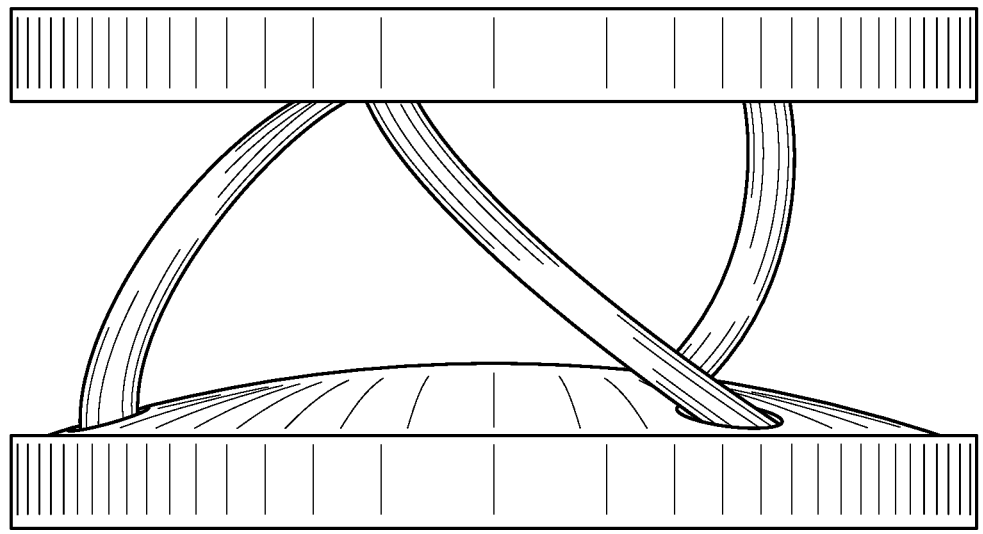
FIG. 10 shows a third elevation view of the rotating and collapsible discs of FIG. 6.
Figure 11:
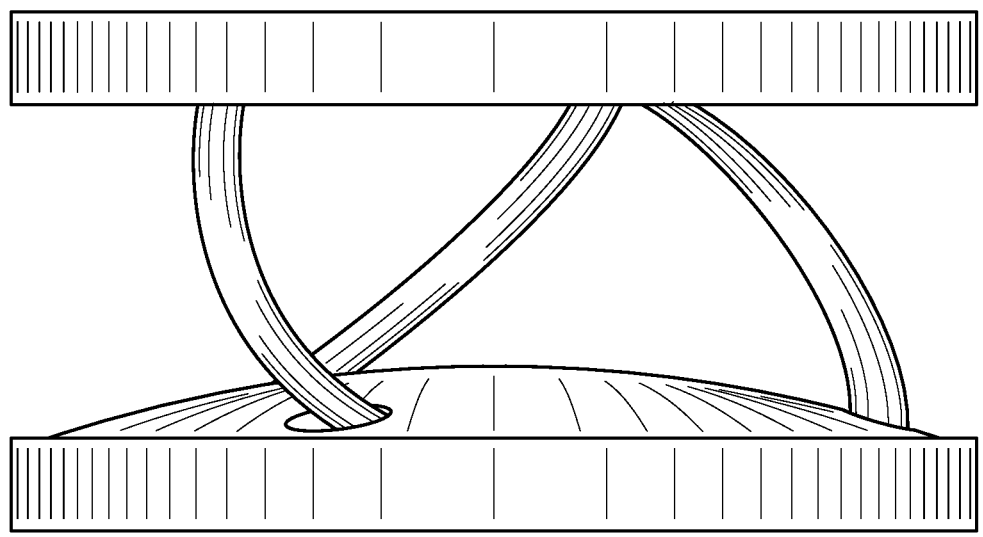
FIG. 11 shows a fourth elevation view of the rotating and collapsible discs of FIG. 6.

FIG. 6 shows a solid top and side perspective view of rotating and collapsible discs of FIG. 1. FIG. 7 shows a bottom and side perspective view of rotating and collapsible discs of FIG. 6. FIG. 8 shows a first elevation view of the rotating and collapsible discs of FIG. 6. FIG. 9 shows a second elevation view of the rotating and collapsible discs of FIG. 6. FIG. 10 shows a third elevation view of the rotating and collapsible discs of FIG. 6. FIG. 11 shows a fourth elevation view of the rotating and collapsible discs of FIG. 6. These figures allow the viewer to see a completed version from the product from all sides. Note that the flanges are curvilinear and extend in a curvilinear manner into the portals of the bottom disc where, when pressed into the disc further, the flanges then extend horizontally across the disc in embodiments of the disclosed technology.

The covers can be identical or substantially identical where "substantially identical" is defined as having a same or substantially the same circular circumference of a most elongated or largest plane but having different depths and/or lips. For example, the top disc 10 can have a downward extending lip. That is, having different depths is still to be considered within the definition of "substantially" provided in the Summary of this disclosure.

Referring to all of the embodiments simultaneously, the devices can be procured out of two molds and flanges with a frictional end, slidable hinges, etc. The two molds can be identical or substantially identical (e.g. but for a lip or depth of a disc). Thus, a mold can be used to create a disc and flange together or separately with other such corresponding molds making up a bottom side thereof.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A set of collapsible discs comprising:
   a top and bottom disc;
   a plurality of individual flexible flanges extending from said top disc through respective portals in said bottom disc;
   wherein each of said plurality of individual flexible flanges extends further or less far into said respective portals in said bottom disc when said top and bottom disc are rotated relative to one another;
   wherein each of said respective portals in said bottom disc have an elliptical and non-circular cross-section.

2. The set of collapsible discs of claim 1, wherein each of said plurality of individual flexible flanges has an end which is wider than a body thereof.

3. The set of collapsible discs of claim 1, wherein in a resting condition, each said end is frictionally held within said bottom disc.

4. The set of collapsible discs of claim 3, wherein each said end is circumferentially abutted against a respective hollow track within said bottom disc.

5. The set of collapsible discs of claim 1, wherein each of said respective portals extends into a track which bends in a curvilinear manner until becoming parallel with a top and/or bottom side of said bottom disc.

6. The set of collapsible discs of claim 1, wherein said plurality of individual flexible flanges are three individual flexible flanges connected to said top disc at 120 degree increments there-around.

7. Two discs comprising:
   at least three flexible flanges fixedly connected to a top disc and slidably connected through at least three portals of a bottom disc, wherein each portal of said at least three portals corresponds to a flanges of said at least three flanges;
   track extending from said portal into an inner space of said bottom disc;
   a bulbous end of said each flange of said at least three flanges having an uncompressed cross-sectional area equal to or greater than that of a cross-sectional area of said hollow track;
   wherein each said portal has a non-circular elliptical cross-section at an opening thereof.

8. The two discs of claim 7, wherein said track extends curvilinearly from a respective said portal.

9. The two discs of claim 8, wherein said curvilinearly extending track turns into a horizontal section of said track.

10. The two discs of claim 7, wherein said two discs are rotatable and reversible rotatable with respect to one another.

11. The two discs of claim 10, wherein rotating said top disc and said bottom disc with respect to one another in a first direction causes each of said at least three flexible flanges to be further inserted into said bottom disc.

12. The two discs of claim 11, wherein rotating in said first direction further causes said top disc and said bottom disc to be pulled closer together.

13. The two discs of claim 11, wherein rotating said top disc and said bottom disc with respect to one another in a second direction, opposite said first direction, causes each of said at least three flexible flanges to be partially pulled out from an interior of said bottom disc.

14. The two discs of claim 13, wherein rotating in said second direction further causes said top disc and said bottom disc to be pushed away from each other.

* * * * *